United States Patent [19]

Hoffmann

[11] Patent Number: 5,005,664
[45] Date of Patent: Apr. 9, 1991

[54] VEHICLE LOCKING SYSTEM

[75] Inventor: David Hoffmann, Luton, United Kingdom

[73] Assignee: Ralph Leslie Harris, United Kingdom

[21] Appl. No.: 452,035

[22] Filed: Dec. 18, 1989

[30] Foreign Application Priority Data

Jun. 5, 1989 [GB] United Kingdom ............... 8912871

[51] Int. Cl.$^5$ ............................................ B60R 25/00
[52] U.S. Cl. .................................. 180/287; 307/10.2; 70/237
[58] Field of Search .............. 180/287; 307/10.1, 10.2; 70/237

[56] References Cited

U.S. PATENT DOCUMENTS

| | | | |
|---|---|---|---|
| 4,638,294 | 1/1987 | Sakurai | 180/287 |
| 4,835,533 | 5/1989 | Akutsu | 180/287 |
| 4,848,509 | 7/1989 | Bruhnke et al. | 180/287 |

Primary Examiner—Richard A. Bertsch
Attorney, Agent, or Firm—Shlesinger, Fitzsimmons & Shlesinger

[57] ABSTRACT

A vehicle locking system for a secure delivery van having a driver's cabin and a cargo space with respective doors has an electrically operable locking system including a selection member in the driver's cab, and a respective key operated switch at the or each cargo space door. The system immobilizes the vehicle except in one position of the selection member, and all the doors are locked when the selected member is positioned to allow the vehicle to be driven. Furthermore where the vehicle has a plurality of doors to the cargo space, only a selected such door, as selected by the selection member, may be opened. The system is designed to minimize opportunistic theft which might otherwise be permitted by the vehicle driver neglecting to lock doors.

6 Claims, 2 Drawing Sheets

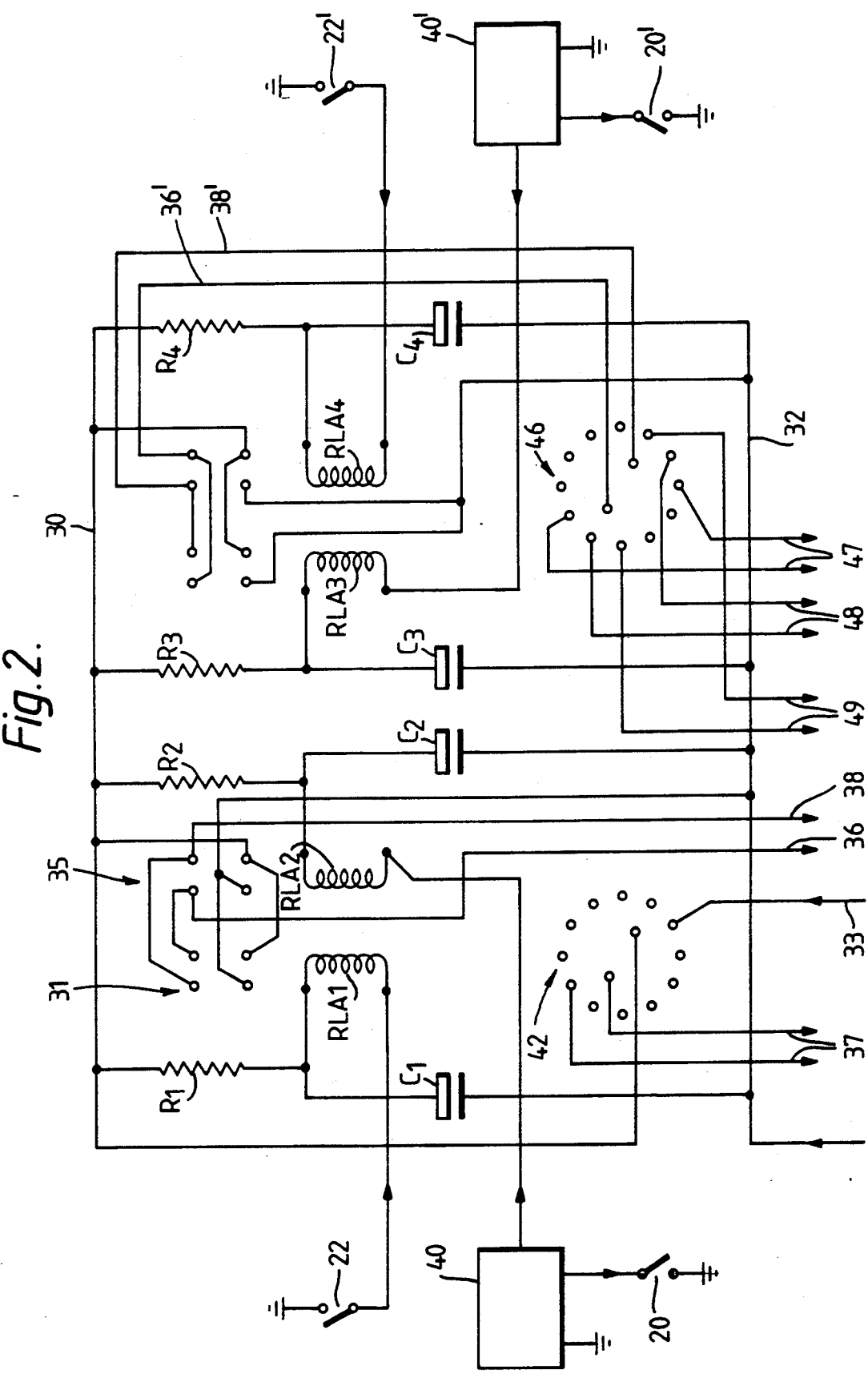

VEHICLE LOCKING SYSTEM

BACKGROUND OF THE INVENTION

This invention relates to a vehicle locking system, for example for delivery vans used in parcel delivery services.

Operators of such parcel delivery services, particularly of services specialising in the delivery of generally valuable packages which it is considered it would be unsafe to send by ordinary post, at present suffer considerable losses through opportunistic theft. Such theft occurs typically when the van has stopped to deliver one package with the driver having left the vehicle with a door unlocked, so that the thief has access temporarily to, for example, the driver's cabin, whilst the driver is in the premises to which a delivery is being made or is occupied at, for example, a rear door of the vehicle, or has access to the cargo space of the vehicle through a side door whilst the driver is at the rear door and so on. Whilst such thefts can, of course, be minimised if the drivers follow a strict security routine, such routines tend to be time consuming and burdensome and points in the routine may be accidentally or deliberately overlooked, again affording opportunities for theft.

SUMMARY OF THE INVENTION

It is an object of the present invention to provide a vehicle locking system adapted to combat theft of the character referred to.

According to one aspect of the invention there is provided a vehicle locking system for a vehicle having a plurality of doors, wherein said doors are provided with respective locks operable automatically by a central control facility, and said facility is so arranged that only one of said plurality of doors may be unlocked at any time.

According to another aspect of the invention there is provided a vehicle locking system for a vehicle having at least one door provided with a lock operable automatically by a control facility which also includes immobilising means for immobilising the vehicle, and wherein said control facility is so arranged that when it is in its state in which said door is unlocked, said immobilising means is in a condition immobilising the vehicle, and when the control facility is in its state in which the vehicle is no longer immobilised by said immobilising means said door is necessarily locked.

An embodiment of the invention is described below by way of example with reference to the accompanying drawings.

BRIEF DESCRIPTION OF THE DRAWINGS

In the Drawings:

FIG. 1 is a schematic diagram illustrating a vehicle locking system embodying the invention and FIG. 2 is a circuit diagram showing part of a central control facility for the locking system of FIG. 1.

DESCRIPTION OF PREFERRED EMBODIMENT

Figure 1:
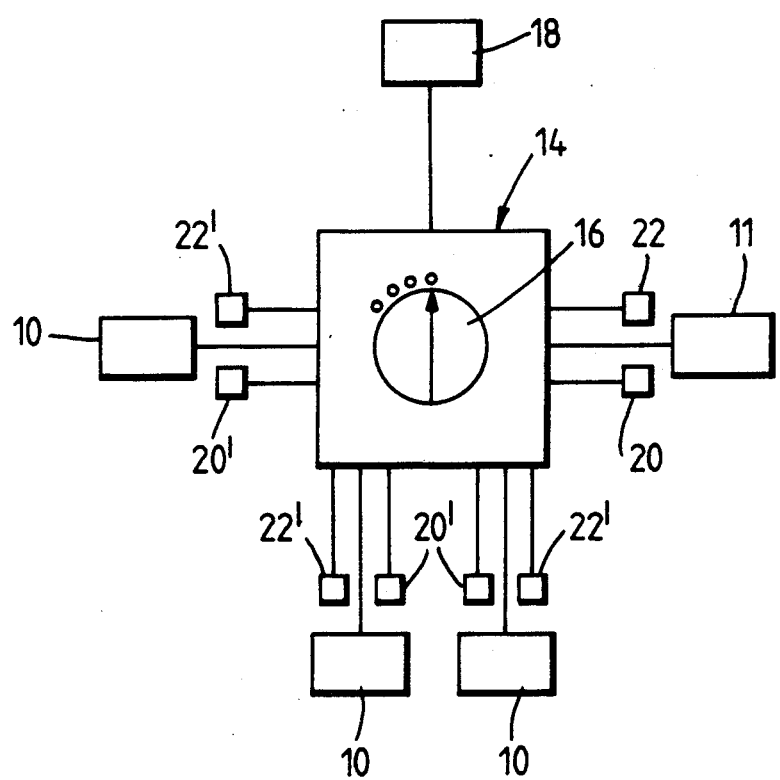

In the preferred embodiment of the invention, a delivery van (not shown) is provided with four doors comprising, for example, the driver's door and a passenger door both providing access to the driver's cabin and a rear door and a side door providing access to a cargo space of the van. These four doors are provided with respective solenoid-operated locks indicated schematically in FIG. 1, the lock on the driver's door being indicated at 11 and the locks on the remaining doors at 10. Each lock is controlled by a central control facility 14 mounted in the driver's cabin and including a rotary selection switch 16 operable by a control knob accessible to the driver. The vehicle is also equipped with an immobilising device 18, such as an ignition cut-out, fuel cut-off valve or the like also controlled by the facility 14. The driver's door is provided with a door switch 20 and a key-operable switch 22, whilst the other doors of the vehicle are provided with respective door switches 20' and with respective key-operable switches 22'.

In operation of the vehicle, the immobilising device 18 is disabled in only one position of the switch 16, (herein referred to as the "drive" position) so that the vehicle can be driven away only with the switch 16 in the "drive" position. Furthermore, in this "drive" position, the facility 14 ensures that all of the doors are locked by means of the respective solenoid locks 10, 11.

Apart from the angular position of the switch 16 in which the vehicle immobilising device is disabled, (i.e. the "drive" position), the switch 16 may be placed in any of three other angular positions, each corresponding to a respective one of the doors of the vehicle (apart from the driver's door). In each of said three other positions, only the respective door of the vehicle (besides the driver's door) may be unlocked, such unlocking requiring the driver to operate, from the outside of the vehicle, the respective key-operated switch 22'.

The arrangement is furthermore such that whenever any door of the vehicle is closed, it will automatically be locked after a short time delay.

Thus, in a typical delivery scenario, the driver drives the vehicle to the point where a delivery is to be made and must then turn the switch 16 from its "drive" position to the position appropriate to unlocking of the selected door from which a delivery is to be made before exiting from the driver's cabin to make the delivery. If the driver does not turn the selector switch from the "drive" position, he will be unable to unlock any of doors of the vehicle (apart from the driver's door) from the outside of the vehicle. For safety (having regard to the possibility of a failure in the control facility 14 or the lock-operating solenoid), the lock on the driver's door is provided with a manual override on the inside of the driver's door, whereby the driver's door can be unlocked from within the driver's cabin mechanically, by a manual operation.

Assuming that the switch 16 has been placed in a position other than the "drive" position, and provided that the driver remembers at least to shut his door, the latter will be locked shortly after he does so after emerging from the cabin, thereby denying access to the cabin to any thief whilst the driver is, for example, at the back door of the vehicle. Furthermore, since every door of the vehicle is automatically locked after it has been shut, there is no risk that the driver may neglect to lock, for example, the rear doors of the vehicle after one delivery so that, for example, whilst the driver is extracting a package from the side door, a thief may open the rear door and steal a package or packages from the cargo space. Likewise, as the doors to the cabin of the vehicle are locked automatically there is no easy way for a thief to gain access to the cabin of the vehicle whilst the driver is outside the vehicle effecting a delivery.

Referring to FIG. 2, the facility 16 includes, for the driver's door, an unlocking relay RLA1 and a locking relay RLA2 and, serving the other three doors in common, as described in more detail below, a locking relay RLA3 and an unlocking relay RLA4. The energising coil of each relay is connected, at one end, with a respective switch arranged, when operated, to earth that end of the coil and is connected, at its other end, with the junction between a respective electrolytic capacitor C1 to C4 and resistor R1 to R4. Associated with each of the relays RLA1 to RLA4, is a respective circuit branch comprising a electrolytic capacitor (C1 to C4) and resistor (R1 to R4) connected in series between a positive supply rail 30 and a negative supply rail 32, the rail 32 being connected to earth, i.e. to the negative terminal of the vehicle battery. (It is assumed that the vehicle has the usual negative earth arrangement). The positive rail 30 is connectable, by way of switching means incorporated in the switch 16, with a positive supply line 33 connected with the positive terminal of the vehicle battery. In the arrangement shown, each capacitor (C1 to C4) is connected to the rail 32 and each resistor (R1 to R4) is connected to the rail 30.

The solenoid-operated locks 10, 11 of the vehicle are mechanically latched, and the operating solenoids are of the polarised variety. Accordingly, to move any of the solenoid-operated locks from its locked to its unlocked position, it is merely necessary to apply a voltage of the appropriate polarity across the operating coil of the solenoid for a short period, the lock remaining in the unlocked position after the supply of such current is terminated. Conversely, to move the lock from the unlocked to the locked position, it is merely necessary to apply a voltage of the opposite polarity to the solenoid coil for a brief period, the mechanical latching again ensuring that the lock remains in the locked position after the supply of current to the solenoid has been terminated.

The relays RLA1 and RLA4 serve, when energised, to supply to the respective lock solenoids current in the appropriate direction for unlocking the respective doors whilst the relays RLA2 and RLA3 serve, when energised, to supply current in the opposite direction to the respective lock solenoids to lock the doors.

Referring to FIG. 2, and considering first the circuitry associated with the solenoid lock 10 for the driver's door, conductors 36 and 38 connected to respective ends of the lock-operating solenoid, are connected to respective switch contacts of the relays RLA1 and RLA2 whilst the cooperating switch contacts of the relays RLA1 and RLA2 are connected, as indicated, with the positive and negative supply lines 30, 32, in such a way that when the relay RLA1 is energised (and the relay RLA2 de-energised) the conductor 36 is connected with the positive supply line 30 and the conductor 38 with the negative supply line 32 and, conversely, when the relay RLA2 is energised and the relay RLA1 de-energised, the line 38 is connected with the positive supply line and conductor 36 with the negative supply line 32. The switch contacts of relays RLA1 and RLA2 are indicated generally at 31 and 35 respectively in FIG. 2. The arrangement is such that when any of the relays RLA1, RLA2 is de-energised, the respective switch contacts of that relay which are connected to the conductors 36, 38 are isolated. Consequently, current is supplied to the respective door lock operating solenoid only when one or other of the relays RLA1 and RLA2 is energised. The values of the resistors R1 to R4 are such as to limit the current which can pass therethrough to a value less than required to energise the respective relay. Energisation of any of the relays RLA1 to RLA4 is accordingly only by discharge of the capacitors C1 to C4 so that even if the respective switch which operates any of the relays is kept closed for a protracted period of time, (and the nature of the switches is such that this in itself is unlikely), the respective relays are energised only momentarily and hence the door-lock operating solenoids are likewise energised only momentarily. Accordingly, current consumption is reduced and overheating of the door lock operating solenoids is avoided.

The relay RLA1 is energisable by closure of the key switch 22 associated with the driver's door, whilst the relay RLA2 is operable by a switch (not shown) incorporated in a delay timer 40 which is arranged to close the last-noted switch at a predetermined period after the door switch of the driver's door has opened (signifying that the door itself has been closed). A convenient time delay for the delay timer 40 has been found to be 5 seconds.

FIG. 2 illustrates schematically at 42 part, (for example, a "gang" where the switch 16 is in the form of a multi-gang switch), of the rotary switch 16, which switch part 42 ensures that in the "drive" position of the switch 16 current is supplied from the supply line 33 to the vehicle immobilising means 18 to disable the latter. Only the terminals of the respective "gang" are represented in FIG. 2. Means is connected with the switch part 42 by conductors 37. (For security, the vehicle immobilising means 18 is arranged to be in its state in which it immobilises the vehicle when no current is supplied to the device 18). In the "drive" position of the switch 16, the line 30, also connected with switch part 42, is disconnected from the supply line 33. Preferably a panel light (not shown) is lit when the switch 16 is in its "drive" position, but is otherwise extinguished, so that the driver can ascertain readily that the vehicle is ready to be driven. In the other three permitted angular positions of the switch 16, the line 33 is connected with the rail 30 allowing the relays RLA1 to RLA4 to control the operation of the respective lock solenoids. It will be appreciated from this that whenever the switch 16 is moved from the "drive" position, the driver's door is unlocked automatically.

The part of the circuitry of FIG. 2 devoted to operation of the solenoid locks for the other three doors of the vehicle is identical with that described above in relation to the circuitry for operating the driver's door locks except that the conductors 36', 38', which correspond with the lines 36, 38, are connected with a portion (gang) 46 of the rotary selector switch 16, respective pairs 47, 48, 49 of conductors from each of the locks 10 for the other three doors being connected with respective contacts of the switch part 46 in such a way that, for any of the permitted positions of the selector switch 16 apart from the "drive" position, only the conductors from the selected lock solenoid are connected, through the switch part 46, with the conductors 36', 38', with the conductors from the other lock solenoids being isolated, whilst in the "drive" position of the selector switch 16, the conductors 47, 48, 49 from all of the locks 10 are isolated. Accordingly, operation of relays RLA3 and RLA4 is effective to control only the lock 10 of which the solenoid is connected for the time being through the switch part 46 to the conductors 36', 38'.

The door switches 20' for the three doors with which the solenoid locks 10 are associated are connected to a delay timer 40' identical with timer 40 in parallel with one another, so that all of the doors associated with the locks 10 must be closed before the delay timer 40' begins to time out its predetermined period. Likewise, the key switches 22' for all of the three doors associated with solenoid locks 10 are connected in parallel with each other, to relay RLA4, so that, in principle, operation of the key switch for any of these doors will allow any other of these doors to be open although this, in practice, is something unlikely to occur. Accordingly, only one of the three key switches 22' is illustrated in FIG. 2 and only one of the three door switches 20'.

The preferred delay for the timer 40' is again 5 seconds. It will be appreciated that, because, in practice, any door switches 20, 20' will open slightly before the associated door is fully closed, some delay is necessary in operation of the solenoid locks to lock the respective door otherwise the respective lock bolt will be projected before it is aligned with its complementary locking formation.

I claim:

1. A vehicle locking system for a vehicle having a driver's cab and at least one door remote from the driver's cab, a lock for said door, a control facility for operating said lock automatically, said system including immobilizing means for immobilizing the vehicle, and wherein said control facility controls said immobilizing means, said control facility including a control member located in the driver's cab and movable to any of a plurality of positions, in one of which positions the control facility selects said door and immobilizes the vehicle, and in another of which positions the vehicle is no longer immobilized by said immobilizing means but said door is necessarily locked, said control facility including a key-switch located adjacent said door remote from the driver's cab, said key switch including an operating member providing a keyhole exposed adjacent said door for receiving a key whereby the key switch may be operated, said control facility being arranged to open said door only if said control member is in a position to immobilize the vehicle and select said door and said key switch is operated.

2. A vehicle locking system according to claim 1 wherein the vehicle has a plurality of doors, a respective lock for each of said doors, said locks being operable by said control facility, said control facility being such that different said doors are selected in different positions of the control member and that only a said door which is selected by the control member at any time maybe unlocked while any door not so selected may not be unlocked, even when the vehicle is immobilized.

3. The vehicle locking system of claim 2 including, for each of said doors, means for sensing when said door is closed, and wherein said control facility is arranged to cause the respective said lock to be placed in its door-locking state when the respective door is closed.

4. A vehicle locking system for a vehicle having at least one door, the system including a lock for said door, a control facility for operating said lock automatically, said system also including immobilizing means for immobilizing the vehicle, and wherein said control facility controls said immobilizing means and is so arranged that when said control facility is in its state in which said door is unlocked, said immobilizing means is in a condition immobilizing the vehicle, and when the control facility is in its state in which the vehicle is no longer immobilized by said immobilizing means said door is necessarily locked, and wherein the vehicle further includes a driver's cab and said at least one door being remote from the driver's cab and wherein said control facility includes a control member located in the driver's cab, a key-switch located adjacent said door remote from the driver's cab, said key switch including an operating member incorporated in the associated lock providing a keyhole exposed adjacent said door for receiving a key whereby the key-switch may be operated, said control facility being arranged to open said door only if said control member is in a position to immobilize the vehicle and select said door and said key-switch is operated.

5. The vehicle locking system of claim 4 including means for sensing when said door is closed, and wherein said control facility is arranged to cause said automatically operable lock to be placed in its door-locking state when the respective door is closed.

6. The vehicle locking system of claim 5 wherein said control facility includes time delay means whereby, when said door is closed, said lock is placed in its door-locking position only after a predetermined delay.

* * * * *